United States Patent [19]

DiLullo et al.

[11] Patent Number: 4,897,642

[45] Date of Patent: Jan. 30, 1990

[54] VEHICLE STATUS MONITOR AND MANAGEMENT SYSTEM EMPLOYING SATELLITE COMMUNICATION

[75] Inventors: Joseph V. DiLullo, Rydal; Stephan C. Schifter, Philadelphia, both of Pa.; Michael Negin, Pennsauken, N.J.; Kenneth W. Paist, Philadelphia, Pa.

[73] Assignee: Secura Corporation, Bala Cynwyd, Pa.

[21] Appl. No.: 258,162

[22] Filed: Oct. 14, 1988

[51] Int. Cl.$^4$ .......................... H04B 1/00; G08B 5/22
[52] U.S. Cl. .............................. 340/825.060; 340/991; 340/988; 340/825.540; 340/825.050; 455/54; 455/99; 364/424.01; 235/385; 379/58
[58] Field of Search ...................... 340/825.06, 825.07, 340/825.08, 825.35, 825.54, 505, 539, 572, 901, 988, 991, 952, 993; 307/9.1, 10.1; 379/58, 59; 235/384, 385; 364/424.01, 449, 424.03; 342/457; 455/11, 12, 89, 95, 54, 99, 345

[56] References Cited

U.S. PATENT DOCUMENTS

| | | | |
|---|---|---|---|
| 3,419,865 | 5/1967 | Chisholm | 340/24 |
| 3,518,674 | 6/1970 | Moorehead et al. | 343/112 |
| 3,644,883 | 2/1972 | Borman et al. | 340/23 |
| 3,711,856 | 1/1973 | Adrian et al. | 343/103 |
| 4,009,375 | 2/1977 | White et al. | 235/150 |
| 4,077,005 | 2/1978 | Bishop | 325/32 |
| 4,107,689 | 8/1978 | Jellinek | 343/112 |
| 4,247,897 | 1/1981 | McDonald et al. | 364/424.01 |
| 4,324,415 | 4/1982 | Rush et al. | 364/424.01 |
| 4,359,733 | 11/1982 | O'Neill | 343/6.5 |
| 4,636,950 | 1/1987 | Caswell et al. | 235/385 |
| 4,652,853 | 3/1987 | Tagami et al. | 340/825.06 |
| 4,688,244 | 8/1987 | Hannon et al. | 235/385 |
| 4,691,801 | 9/1987 | Mann et al. | 180/287 |
| 4,701,760 | 10/1987 | Raoux | 340/993 |
| 4,739,183 | 4/1988 | Tokura et al. | 340/825.06 |
| 4,740,792 | 4/1988 | Sagey et al. | 342/457 |
| 4,744,083 | 5/1988 | O'Neill et al. | 371/22 |
| 4,750,197 | 6/1988 | Denekamp et al. | 235/385 |
| 4,751,512 | 6/1988 | Longaker | 342/357 |
| 4,797,948 | 1/1989 | Milliorn et al. | 340/991 |
| 4,804,937 | 2/1989 | Barbiaux et al. | 364/424.01 |

FOREIGN PATENT DOCUMENTS

| | | | |
|---|---|---|---|
| 0121902 | 6/1985 | Japan | 364/424.01 |
| 5911900 | 8/1985 | Japan | 364/424.01 |
| 2119095 | 11/1983 | United Kingdom | 364/424.9 |

OTHER PUBLICATIONS

Article Entitled, "2001 Communications-Knowing Your Place", Discover Magazine, Nov., 1988 issue.

Primary Examiner—Donald J. Yusko
Assistant Examiner—Eric Pudpud
Attorney, Agent, or Firm—Woodcock Washburn Kurtz Mackiewicz & Norris

[57] ABSTRACT

Apparatus and method for monitoring the status of a multiple part vehicle are disclosed. Apparatus according to the invention comprises a tag on a second part of the vehicle which impresses a unique ID code of the vehicle's existing electrical system. An interface unit in a first part of the vehicle detects the presence of a valid ID code on the vehicle's electrical system and in response provides an indication that the second part of the vehicle is connected. A mobile satellite transmitter provides data indicative of the status of the vehicle to an earth station via a satellite. Vehicle position data is also provided to the earth station with each transmission.

35 Claims, 10 Drawing Sheets

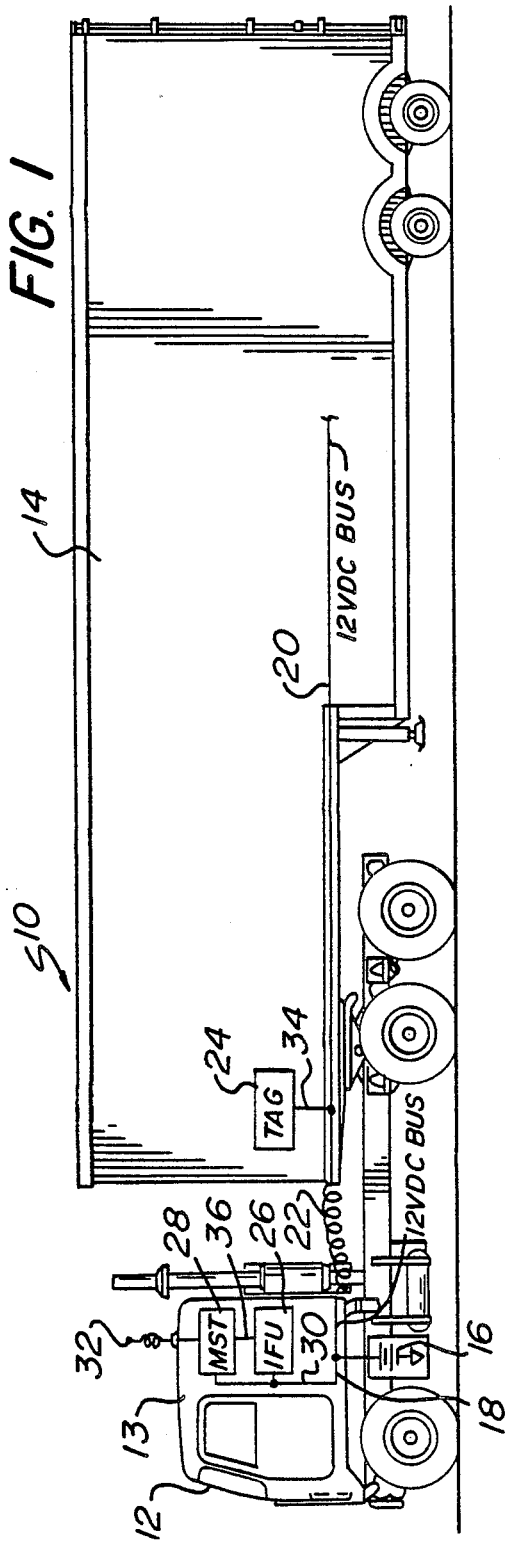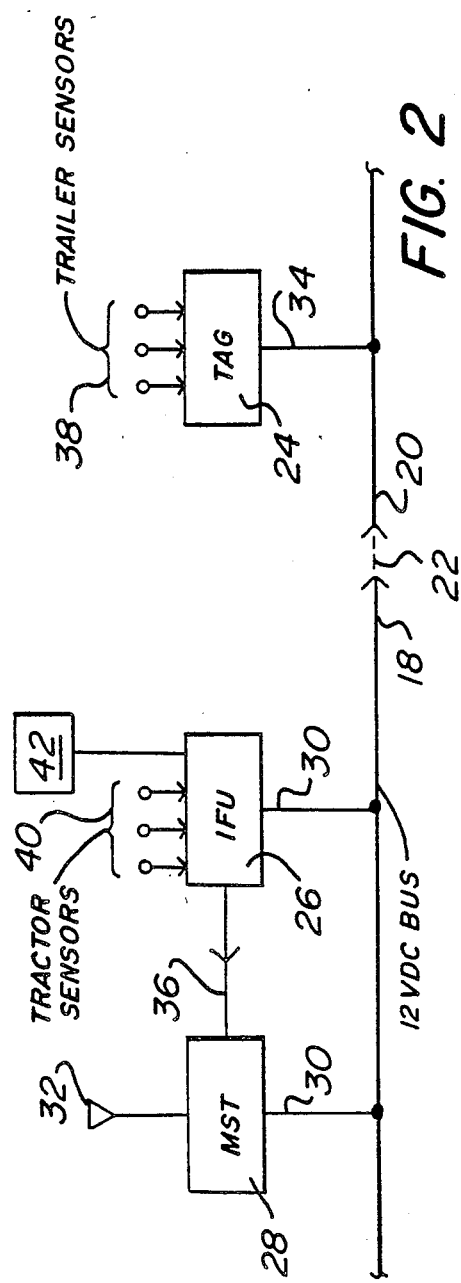

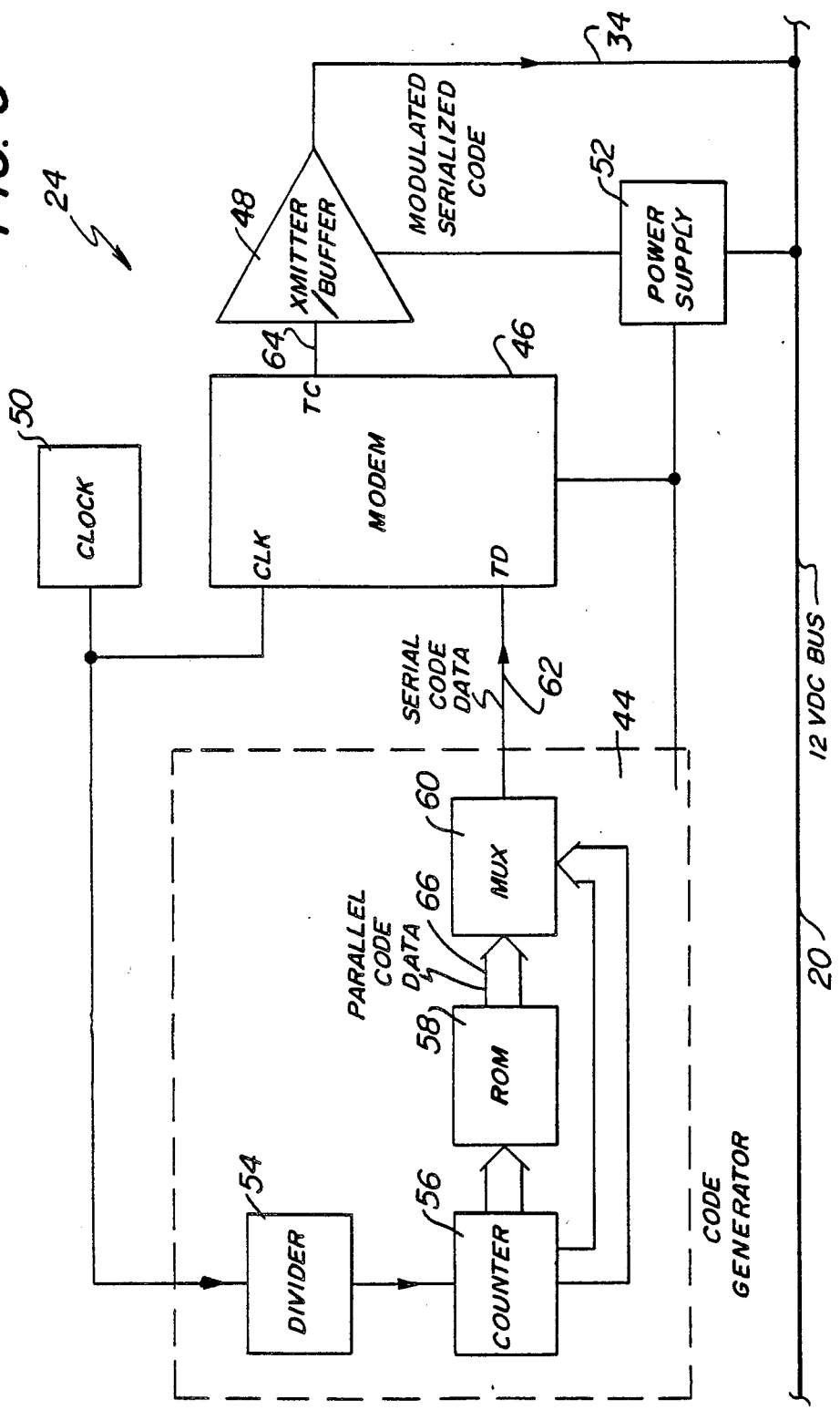

OVERVIEW - IFU FUNCTION

TAG OPERATION (DUMB)

TAG OPERATION (SMART)

DETAIL - IFU FUNCTION

VEHICLE STATUS MONITOR AND MANAGEMENT SYSTEM EMPLOYING SATELLITE COMMUNICATION

BACKGROUND OF THE INVENTION

The present invention generally relates to a method and apparatus for managing and monitoring the status of a fleet of vehicles. More particularly, the present invention relates to a method and apparatus for periodically transmitting status and position data from a vehicle to a central station via satellite.

The present invention has particular application to multiple part vehicles such as tractor-trailers of the type which comprise a tractor that can be detachably coupled to a trailer(s). However, the invention is also applicable to other types of vehicles such as railroad cars, buses, boats or ships and any other type of transportation apparatus wherein it is desirable to monitor the status and location thereof on a regular basis.

Fleet management is a major concern in the trucking industry. The fleet manager(s) must keep track of the status and location of each tractor and trailer in the fleet. Thus, for each trailer in the fleet, the fleet manager must know whether it is in service (i.e., coupled to a tractor) or out of service (i.e., not coupled to any tractor); the fleet manager must have similar information with respect to whether each tractor in the fleet is hauling a trailer or is available for service. The fleet manager should also be able to monitor the progress of each vehicle in the fleet for scheduling purposes. Only with this information can the fleet be efficiently managed.

Security is also a major concern to the fleet manager. Vehicle theft is commonplace in the trucking industry, and the fleet manager should be kept aware of unauthorized use of vehicles. Moreover, it is desirable that the fleet manager have the capability of tracking the travel of a vehicle in unauthorized use so that law enforcement authorities can be kept apprised accordingly.

The mechanical condition and various operating parameters of each vehicle in the fleet are also of importance to the fleet manager. The fleet manager should have regular access to operating parameters of the vehicle such as speed, engine temperature, oil pressure, brake line pressure and the like, as well as trailer parameter data such as interior temperature and humidity of the trailer (if applicable) for each trailer that is in service. The fleet manager should also be immediately apprised of any abnormality in any of the operating parameters.

Known systems and methods for accomplishing the foregoing are either expensive, impractical, inefficient or time consuming. It is therefore desirable to provide a vehicle status monitor and management system which accomplishes the foregoing which is simple, practical, inexpensive and easy to implement. The present invention achieves these objectives.

SUMMARY OF THE INVENTION

The present invention is described herein for particular use on a tractor-trailer vehicle of the type comprising a tractor and a detachable trailer, but also has application to other types of vehicles. Accordingly, the following description is not intended to limit application of the invention in any way to tractor-trailer vehicles and reference should be made to the appended claims for the true scope of the invention.

A status monitoring system for a vehicle of the type comprising a tractor and a detachable trailer is provided. As is known, the tractor has a power bus with a power cable that is connectable to the trailer when the trailer is coupled to the tractor. As is also known, the trailer has a power bus that is energized and electrically coupled to the tractor's power bus when the power cable is connected thereto. According to the invention, the status monitoring system comprises a tag (identifying apparatus), an interface unit (IFU) and a mobile satellite transmitter (MST). The tag is mounted on or in the trailer and electronically impresses an ID code on the trailer's power bus when the power bus is energized. (Alternatively, the tag may communicate ID code data by other means such as infrared, acoustic, RF or other electromagnetic transmitters.) The ID code is unique and identifies the trailer. The IFU detects the presence of a valid ID code that appears on the tractor's power bus (or in the particular transmission medium employed) when the power cable is connected to the trailer. When a valid ID code is detected, the IFU provides a status indication that a trailer is connected to the tractor; similarly, when a valid ID code is not connected, the IFU provides a status indication that no trailer is connected to the tractor. The IFU may be situated within the tractor's cab or tool compartment, or wherever convenient.

The MST is also preferably situated within the tractor's cab or tool compartment or wherever convenient and may be of the type that includes a position locating unit, for example, of the type employing LORAN. The MST receives the status indication from the IFU and may also receive vehicle position data from the position locating unit, if provided. The MST transmits at least the status indication, and the ID code if available, at preselected (preprogrammed) intervals to an earth station via a space-based satellite. The MST operates under control of the IFU to normally transmit the status indication (and vehicle position data, if provided) at the preselected intervals, but is responsive to a command from the IFU to substantially immediately transmit (i) the status indication (and vehicle position data, if provided) when the presence of a valid ID code is initially detected (thereby indicating that a trailer has initially been connected to the tractor), and (ii) the status indication and the last detected ID code when the lack of a valid ID code is initially detected (thereby indicating that a trailer has initially been disconnected).

The MST may alternatively be of a type that does not include a position locating unit. Rather, the RDSS (radio determination satellite system) may be employed to determine the location of each MST, and hence its associated vehicle, when an MST transmission occurs. As is known, the RDSS uses the actual transmission from a satellite transmitter (such as the MST) to pinpoint its position. Position is computed at the satellite and provided to the earth station. Thus, as in the case of an MST equipped with a position locating unit, each MST transmission results in vehicle position data that is provided to an earth station, even though in one case the position data is generated by the MST and in the other case is generated by the satellite.

According to the preferred embodiment of the invention, the trailer's power bus is modulated with the ID code so that the same appears on the tractor's power bus when the two are connected. According to one preferred embodiment, the tag is "dumb" and repeatedly and cyclically impresses the ID code on the trailer's power bus; the IFU monitors the tractor's power bus to determine whether a valid ID code has been impressed thereon. According to another embodiment, the tag is "smart" and the IFU requests ID code data from the tag. The tag may be provided with inputs for trailer sensors that provide trailer parameter data. If provided, the tag further impresses the trailer parameter data on the trailer's power bus so that the IFU can read the trailer parameter data from the tractor's power bus and provide the same to the MST for transmission to the earth station. The tag may also be responsive to a field programmer connectable to the power bus to alter the ID code stored therein and/or change the tag's operating program.

According to yet another embodiment of the invention, the IFU may be provided with inputs for tractor sensors that provide tractor parameter data. If provided, the IFU reads the tractor parameter data and provides the same to the MST for transmission to the earth station.

The IFU may also be provided with an input for receiving an alarm signal from a vehicle protection device, and, if provided, the IFU provides any alarm indication to the MST for transmission to the earth station. According to this embodiment, the MST operates under control of the IFU to normally transmit the status indication (and vehicle position data, if provided) at the preselected intervals, but is responsive to a command from the IFU to substantially immediately transmit an alarm indication (and vehicle position data, if provided) when an alarm signal is received by the IFU. Also, according to this embodiment, the MST may be responsive to commands from the IFU to substantially immediately transmit tractor and/or trailer parameter indications (and vehicle position data, if provided) when an abnormality in any of the tractor/trailer parameter data or a security violation (e.g., from the vehicle protection device) is detected by the IFU.

According to a preferred embodiment of the present invention, the tag (identifying apparatus) comprises a code generator for providing a digital ID code that is unique to the vehicle, a short haul modem for modulating the code at a preselected baud rate, and a transmitter/buffer for impressing the modulated code on an existing electrical system (power bus) of the vehicle. As mentioned, the tag may alternatively employ other available or specially installed lines or other communication means for communicating the ID code.

A method of monitoring the status of a multiple-part vehicle according to the present invention comprises the steps of impressing a unique ID code on an existing electrical system (power bus) of the vehicle when a second part of the vehicle is connected to a first part of the vehicle; detecting whether a valid ID code has been impressed on the vehicle's existing electrical system; providing a status indication representing the connect/disconnect status of the second part of the vehicle based upon the aforementioned detecting step; transmitting the status indication, and also the ID code if a valid ID code has been detected, to a central station at regular preselected intervals; and, transmitting the status indication and ID code to the central station substantially immediately upon any change in the status indication. Each transmission to the central station may include vehicle position data therewith if the MST is of the type employing a position locating unit. However, each MST transmission always results in vehicle position data being provided to an earth station.

Other features of the invention will be apparent from the following detailed description of the preferred embodiment and from the appended claims.

For a full understanding of the present invention, reference should be made to the following description and to the accompanying drawings.

BRIEF DESCRIPTION OF THE DRAWINGS

FIG. 1 is a diagrammatic view of a preferred embodiment of the present invention as utilized in a tractor-trailer.

FIG. 2 is a overview of a preferred embodiment of the present invention in block diagram form.

FIG. 3 is a block diagram of one preferred embodiment of a tag (identifying apparatus) according to the present invention.

DETAILED DESCRIPTION OF THE PREFERRED EMBODIMENTS

Figure 4:
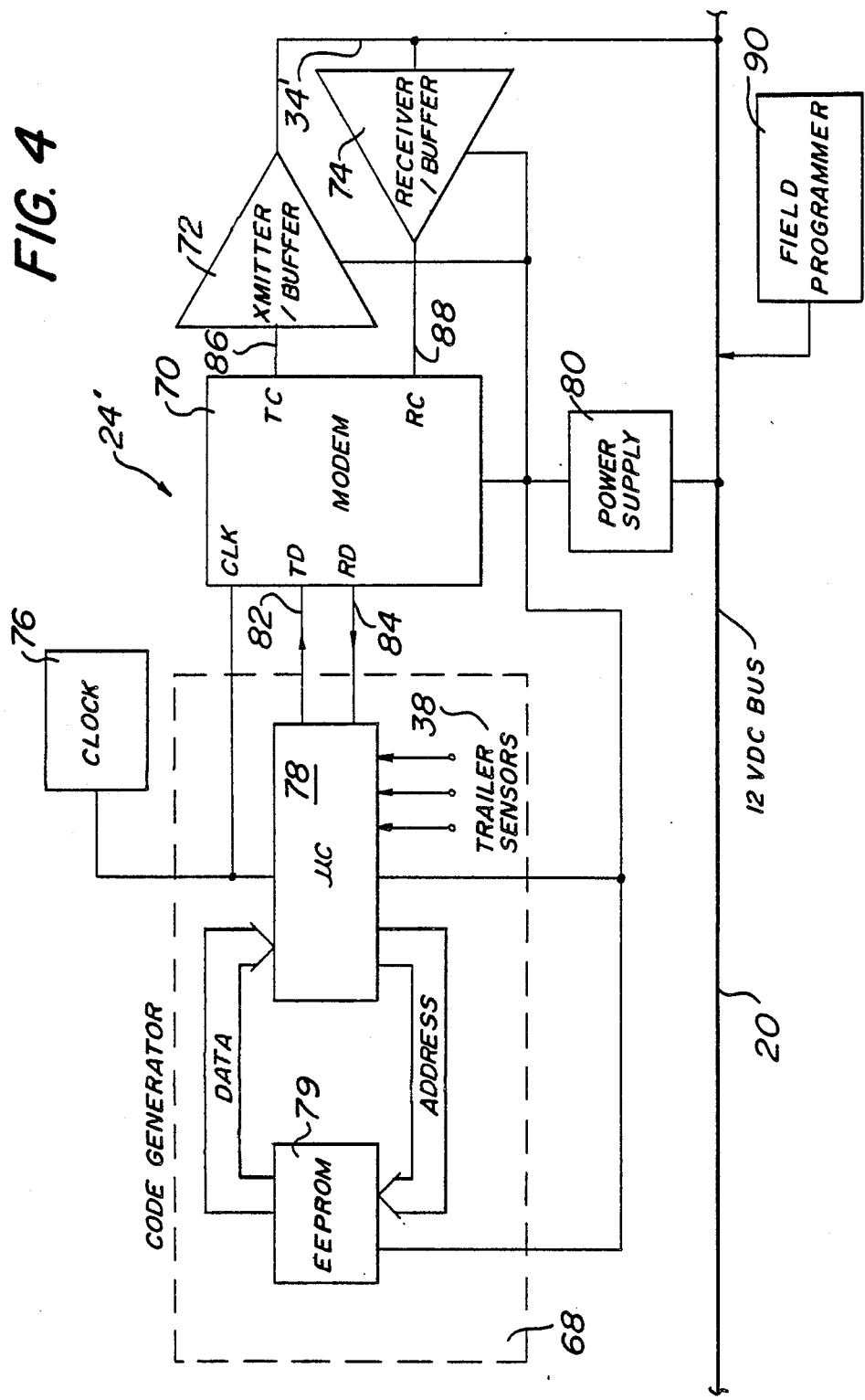
FIG. 4 is a block diagram of another preferred embodiment of a tag (identifying apparatus) according to the present invention.

Referring now to the drawings wherein like numerals represent like elements, there is illustrated in FIG. 1 a tractor-trailer vehicle 10 comprising a tractor 12 and a detachable trailer 14. Tractor 12 includes a cab 13. As is well known, tractor 12 is adapted to be coupled to one of a plurality of trailers 14 in a fleet. As is also well known, tractor 12 includes a 12-volt battery 16 that energizes a 12-volt power bus (existing electrical system) 18 that runs throughout the tractor. As is also known, trailer 14 comprises a normally de-energized power bus (existing electrical system) 20 that runs throughout trailer 14. When trailer 14 is mechanically coupled to tractor 12, the trailer's power bus 20 is energized and electrically coupled to the tractor's power bus 18 by means of the tractor's power cable 22 that is connectable to the trailer 14. Thus, in normal operation, when trailer 14 is coupled to tractor 20, the trailer's power bus 20 is energized, and when the trailer 14 is not connected to a tractor 12, its power bus 20 is not energized.

According to the invention, each trailer 14 in the fleet is provided with an electronic tag 24 (identifying apparatus) and each tractor 12 is provided with an interface unit (IFU) 26 that communicates with an on-board mobile satellite transmitter (MST) 28. MST 28 is coupled to a microwave antenna 32 for transmitting messages to an earth station via a space-based satellite. In the preferred practice of the invention, the MST 28 transmits messages to the well known GEOSTAR satellite(s) that is currently in geosynchronous orbit above the continental U.S. See U.S. Pat. Nos. 4,359,733 and 4,744,083 incorporated herein by reference.

The tag 24, IFU 26 and MST 28, and the manner of communication therebetween, will now be described in greater detail with reference to FIG. 2.

As explained in more detail herein, tag 24 communicates with IFU 26 for the purpose of providing ID code data when the trailer's power bus 20 is energized and coupled to the tractor's power bus 18 by power cable 22. An important feature of the invention is that the tag 24 and IFU 26 communicate with each other by means of the power bus 18, 20 (including the power cable 22 connecting them) so that n additional wiring or interconnections are necessary, although other means and methods of communication are not precluded. Thus, the tag 24 and the IFU 26 preferably use the vehicle's existing electrical system for communication therebetween but other means such as infrared, acoustic, and RF receivers and transmitters can be employed. Thus, it should be understood that although the following description refers to use of the vehicle's existing electrical system for communication between the IFU and the tag, the present invention is not limited thereto except as set forth in the appended claims.

The function of tag 24 is to provide signals containing, inter alia, a unique ID code when the trailer's power bus 20 is energized, i.e., when the trailer 14 is coupled to the tractor 12. The tag 24 impresses signals containing the ID code on the trailer's power bus 20 via connection 34. Since the trailer's power bus 20 is coupled to the tractor's power bus 18 by power cable 22, these signals also appear on the tractor's power bus 18.

IFU 26 is coupled to the tractor's power bus 18 by means of connection 30. The function of IFU 26 is to detect the presence of a valid ID code on the tractor's power bus 18 and, when a valid ID code is detected (indicating that a trailer 14 is connected to tractor 12) provide a status indication to this effect, and likewise when a valid ID code is not detected (indicating that no trailer 14 is connected to tractor 12) provide a status indication to this effect. The IFU 26 provides the status indication and, when detected, the ID code, to MST 28 via a connection 36. The MST may preferably include position locating unit (discussed below), though not necessary. The MST receives the status indication from the IFU and transmits it at preselected intervals to an earth station via a space-based satellite. If the MST includes a position locating unit, then vehicle position data is included in each MST transmission. If the MST is of a type that does not include a position locating unit, then the RDSS may be employed to pinpoint vehicle position based upon the MST transmission. In either case, the earth station is provided with both the status indication and vehicle position data, and the ID code if detected.

The MST may be of any well known type, but in the preferred embodiment of the invention is a Hughes Network Systems Model No. 2101 or 2102. A Sony Corporation Wafarer Mobile Communication Unit, SCD 1000 Series, may also be used. Each of these units includes a microwave transmitter and an antenna 32 for the purpose of transmitting messages to the GEOSTAR satellite. Each also presently includes a position locating unit in the form of a LORAN C receiver and a computer for processing internal data, and commands and data from an external source, in this case the IFU 26. Preferably, the data and commands from the IFU 26 are provided via a serial link 36 to a serial (RS 232) port on the MST 28. Future MSTs may not include a position locating unit and may instead rely upon the RDSS for position data.

The above-identified MSTs are capable of sending three different types of transmissions (messages) that are recognized by the GEOSTAR satellite. These are NORMAL, IMMEDIATE and EMERGENCY. In the absence of a command to the contrary, the MST transmits NORMAL messages at regular preselected intervals; the duration between intervals is user selectable (programmable). The MST operates under control of the IFU to normally transmit the status indication (and vehicle position data when provided) by means of NORMAL messages at the preselected intervals. However, the MST is responsive to a command from the IFU to substantially immediately transmit either an IMMEDIATE or EMERGENCY message containing the status indication (and vehicle position data when provided). GEOSTAR stores NORMAL and IMMEDIATE messages in an electronic mailbox that is polled on an as-needed basis by the user (in this case, the fleet manager) who resides at a central station. EMERGENCY messages are not stored in a mailbox; rather, GEOSTAR requests IMMEDIATE acknowledgement of EMERGENCY messages from the fleet manager. The NORMAL, IMMEDIATE and EMERGENCY modes of transmission are utilized by the present invention as described below.

The above-identified MSTs also have their own identifier which is included with every transmission to GEOSTAR. Moreover, the above-identified MSTs include an internal clock and each transmission is accompanied by data indicating the time of the transmission.

Returning again to FIG. 2, the tag 24 may, if desired, be provided with inputs for receiving signals from one or more trailer sensors. Thus, information respecting the interior temperature and humidity of the trailer, and other critical parameters may be provided to the tag 24. As explained herein, when tag 24 is provided with such capability, the information is impressed on the power buses 18, 20 for reading and processing by the IFU 26 and transmission by the MST 28. Additionally, if desired, the IFU 26 may be provided with inputs for receiving signals from one or more tractor sensors 40. Tractor sensors 40 may provide information regarding tractor operating parameters such as speed, engine temperature, oil pressure and the like. IFU 26 may if desired, provide such information to MST 28 for inclusion with each transmission. IFU 26 may also receive as an input an alarm signal provided by a vehicle protection device 42 on board tractor 12. Preferably, vehicle protection device 42 is of the type described in U.S. Pat. No. 4,691,801, but any suitable vehicle protection device will suffice. In response to an alarm signal, the IFU 26 may provide an alarm indication to the MST 28 for transmission in one of the NORMAL, IMMEDIATE, or EMERGENCY modes, as desired, however transmission in one of the IMMEDIATE or EMERGENCY modes is preferred. Likewise, IFU 26 may be responsive to an abnormal tractor or trailer condition, as indicated by one of the trailer sensors 38 or tractor sensors 40, to cause the MST 28 to transmit the indication of the abnormal condition in one of the IMMEDIATE or EMERGENCY modes.

Turning now to FIG. 3, one preferred embodiment of a tag according to the present invention is depicted. The tag 24 depicted in FIG. 3 is "dumb" in that it is unidirectional and its sole function is to repeatedly and cyclically generate an ID code and impress signals containing the ID code on the power bus 20. As shown, tag 24 comprises a code generator 44 that provides serial code data over a line 62 to the transmit data (TD) input of a modem 46. Code generator 44 and modem 46 receive clock pulses from a clock 50. A short haul modem 46 modulates the serial code data and provides the same at the transmit carrier output (TC) for transmission over a line 64 to a transmitter/buffer 48. The transmitter/buffer 48 impresses the modulated data on power bus 20 by means of connection 34. The transmitter/buffer 48, modem 46, code generator 44 and clock 50 are powered by a power supply 52 that receives its power input from the power bus 20. Thus, the tag 24 is not functional until the power bus 20 has been energized.

The code generator 44 of the tag 24 performs the function of repeatedly and cyclically generating the unique ID code. According to a preferred embodiment of the tag 24, the code generator 44 comprises a divider (counter) 54 receiving clock pulses from the clock 50. Clock pulses of reduced frequency are supplied to a multistate counter 56. Selected outputs of counter 56 provide addresses to the address inputs of a ROM (PROM) 58. ROM 58 is preferably a non volatile, non alterable ROM which has portions of the ID code burned in at sequential addresses thereof. The parallel outputs of counter 56 thus address sequential locations of the ROM so that the ID code is read out in parallel data format to a MUX 60. MUX 60 performs the function of serializing the parallel format data containing the ID code for presentation to the modem 46.

Turning now to FIG. 4, there is illustrated another embodiment of a tag according to the present invention. The tag 24, illustrated in FIG. 4 is "smart" in that it is bi-directional and incorporates a local microcomputer for purposes which will become apparent hereinafter. Tag 24, comprises a code generator 68 that bi-directionally communicates via a short haul modem 70. Thus, code generator 68 communicates serial code data containing the unique ID code over a line 82 to the transmit data (TD) input of modem 70, and modem 70 may communicate serial code data to the code generator 68 (for purposes which will become apparent hereinafter) on a line 84 from its receive data (RD) output. The ID code provided by code generator 68 is modulated by modem 70, and the modulated data is provided at the transmit carrier (TC) output on a line 86 to a transmitter/buffer 72. Transmitter/buffer 72 impresses the modulated data containing the ID code on a line 34' coupled to the power bus 20.

Tag 24' may also comprise a receiver/buffer 74 having an input coupled to the line 34, for receiving modulated data impressed on the power bus 20 by an external source, such as by a field programmer 90. Received modulated data is provided by receiver/buffer 74 over a line 88 to the receive carrier (RC) input of modem 70. Modem 70 demodulates the received data and provides the same to the code generator 68 via line 84 coupled to the receive data (RD) output of modem 70. Control lines (not shown) coupled between code generator 68 and modem 70 provide control signals that control the flow of data therebetween in well known manner.

A power supply 80 receiving input power from the power bus 20 supplies power of appropriate voltage to each of the code generator 68, modem 70, transmitter/buffer 72 and receiver buffer 74.

The code generator 68 of the tag 24, includes the earlier referenced local microcomputer, labeled as 78, and an electrically alterable ROM such as an EEPROM 79. EEPROM 79 and microcomputer 78 are coupled in well known fashion by means of data and address buses and appropriate read/write/enable control lines. The ID code is stored in EEPROM 79. The microcomputer 78 may be suitably programmed to repeatedly and cyclically provide the ID code over line 82 to the modem 70 for impression upon the bus 20 by means of transmitter/buffer 72, as in the case of the tag 24 of FIG. 3. However, inasmuch as tag 24, is capable of bi-directional communication, microcomputer 78 may be suitably programmed to provide the ID code for impression on the power bus 20 only when requested by the IFU 26. Thus IFU 26 may request data from the tag 24 by placing appropriate control instructions on the power buses 18, 20 for reception by the receiver/buffer 74 and processing by the microcomputer 78. Thereafter, microcomputer 78 may respond to provide the requested code or other requested data. Well known polling or handshaking techniques may also be used for this information exchange.

As mentioned, the tag may be provided with inputs for receiving signals from sensors carrying trailer parameter data. Tag 24' may have this capability. As illustrated, microcomputer 78 may have a plurality of inputs 38 for receiving outputs from trailer sensors. Microcomputer 78 may process the trailer parameter data in any well known fashion to place the same on the power bus 20 for receipt by the IFU 26. For example, the trailer parameter data may be repeatedly and cyclically be placed on the power bus 20 together with the ID code. Alternatively, the trailer parameter data may be impressed on the power bus 20 only when requested by the IFU 26. Still further, trailer parameter data may only be impressed on the power bus 20 when microcomputer 78 detects an abnormality in one or more of those data. In any event, the trailer parameter data is modulated by modem 70 and impressed on the power bus 20 by transmitter/buffer 72.

FIG. 4 illustrates a field programmer 90 that may be coupled to the power bus 20. Field programmer 90 may include any well known field programmer and appropriate circuitry, including a modem, for sending instructions to the microcomputer 78. The function of field programmer 90 is to alter and/or verify the ID code stored in the EEPROM 79 and/or to alter the microcomputer's operating program. Thus, the operating program, or ID code stored in the EEPROM 79 of tag 24' may be altered and/or verified by any authorized personnel carrying a field programmer 90.

Figure 5:
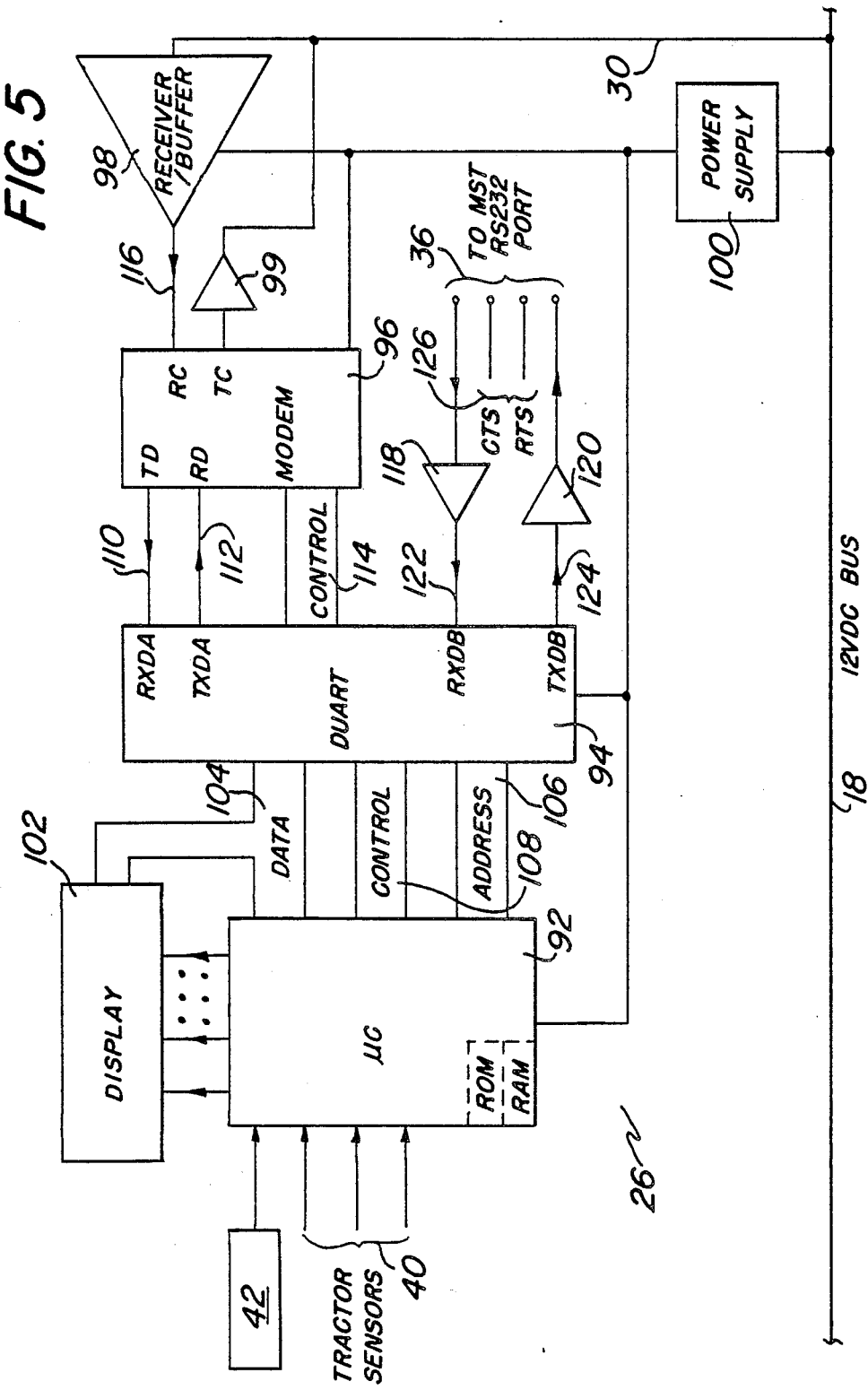
FIG. 5 is a block diagram of an IFU according to the present invention.

FIG. 5 illustrates a preferred embodiment of an IFU according to the present invention. As illustrated, IFU 26 preferably comprises a microcomputer 92 having ROM and RAM for program storage, scratch pad, etc. Microcomputer 92 bi-directionally communicates with a DUART (dual universal asynchronous receiver/transmitter) via data lines 104, address lines 106 and control lines 108, all coupled in well known manner. One-half of DUART 94 communicates with a short haul modem 96, while the other half communicates with the MST 28 via its RS 232 serial port. As illustrated, modem 96 provides demodulated digital data from its transmit data (TD) output to the receive data input (RXDA) of one half of DUART 94 via line 110. Optionally, one half of DUART 94 may provide serial data at its transmit data output (TXDA) via line 112 to the receive data input (RD) of modem 96 for modulating the same and impressing it upon the power bus 18 via a transmitter/buffer 99, for purposes which will become evident hereinafter. The receive carrier input (RC) of modem 96 receives modulated digital data over a line 116 provided by a receiver/buffer 98 coupled to the power bus 18 via line 30. If transmit/buffer 99 is provided, modulated digital data is provided by modem 96 at its transmit carrier output (TC) and impressed on the power bus 18 via line 30. The half of DUART 94 dedicated to communicating with modem 96 is coupled thereto via control lines 114 connected in well known manner.

As illustrated, the other half of DUART 94 communicates with the MST 28 by means of a receiver/buffer 118 connected to its receive data input (RXDB) via a line 122 and a transmitter/buffer 120 connected to its transmit data output (TXDB) via line 124. Control lines 126 (for providing the CTS and RTS signals) are also coupled between the MST 28 and the DUART 94. As mentioned, the signals RXDB, TXDB, CTS and RTS are provided to a RS 232 serial port of MST 28.

A power supply 100 receives input power from the power bus 18 and supplies power of appropriate voltage levels to receive/buffer 98, modem 96, DUART 94, microcomputer 92, and other circuitry as required.

If desired, a display 102 may be provided and coupled to the microcomputer 92 for visually presenting vehicle status information, such as the status indication, alarm conditions, etc. A printer, or audio means for providing voice output, may be provided in substitution for or in addition to the display 102.

As has been stated, the function of IFU 26 is to detect the presence of a valid ID code on the power bus. Thus, modulated digital data appearing on the power bus 18 from a tag 24 or 24, is provided to the receive carrier input (RC) of modem 96 by receive buffer 98. Modem 96 demodulates the received data and provides demodulated serial data to a receive data input (RXDA) of one-half of DUART 94. As is well known, the purpose of DUART 94 is to convert the received serial data to parallel data format for processing by microcomputer 92. Thus, microcomputer 92 functions, inter alia, to detect the presence of a valid ID code in the received data.

The optional transmitter/buffer 99 may be provided if the "smart" embodiment of the tag 24' illustrated in FIG. 4 is utilized. Thus, microcomputer 92 may send commands to the "smart" tag 24' for the purpose of, for example, instructing tag 24' to impress its ID code on the power bus.

Microcomputer 92 may be provided with a number of inputs 40 for receiving outputs from one or more optional tractor sensors. The tractor sensors may provide tractor parameter data such as speed, engine temperature, oil pressure and the like. Microcomputer 92 may be suitably programmed to process the tractor parameter data and provide the same with the detected ID code for inclusion with each MST transmission. Alternatively, microcomputer 92 may be programmed to detect abnormal tractor parameter data and provide an indication of the same together with the detected ID code, for inclusion in an IMMEDIATE or EMERGENCY MST transmission.

Microcomputer 92 may also have an input for receiving an alarm signal from a vehicle protection device 42 of the type herein before described. Microcomputer 92 may be suitably programmed to process the alarm signal and provide any alarm indication, together with any detected ID code, for inclusion in an IMMEDIATE or EMERGENCY MST transmission.

As is evident, all communications with the MST are under control of microcomputer 92 and occur through the DUART 94. Commands from microcomputer 92 determine whether each MST transmission will be one of the NORMAL, IMMEDIATE or EMERGENCY messages herein before described.

The operation of the apparatus thus described will now be explained.

Figure 6:
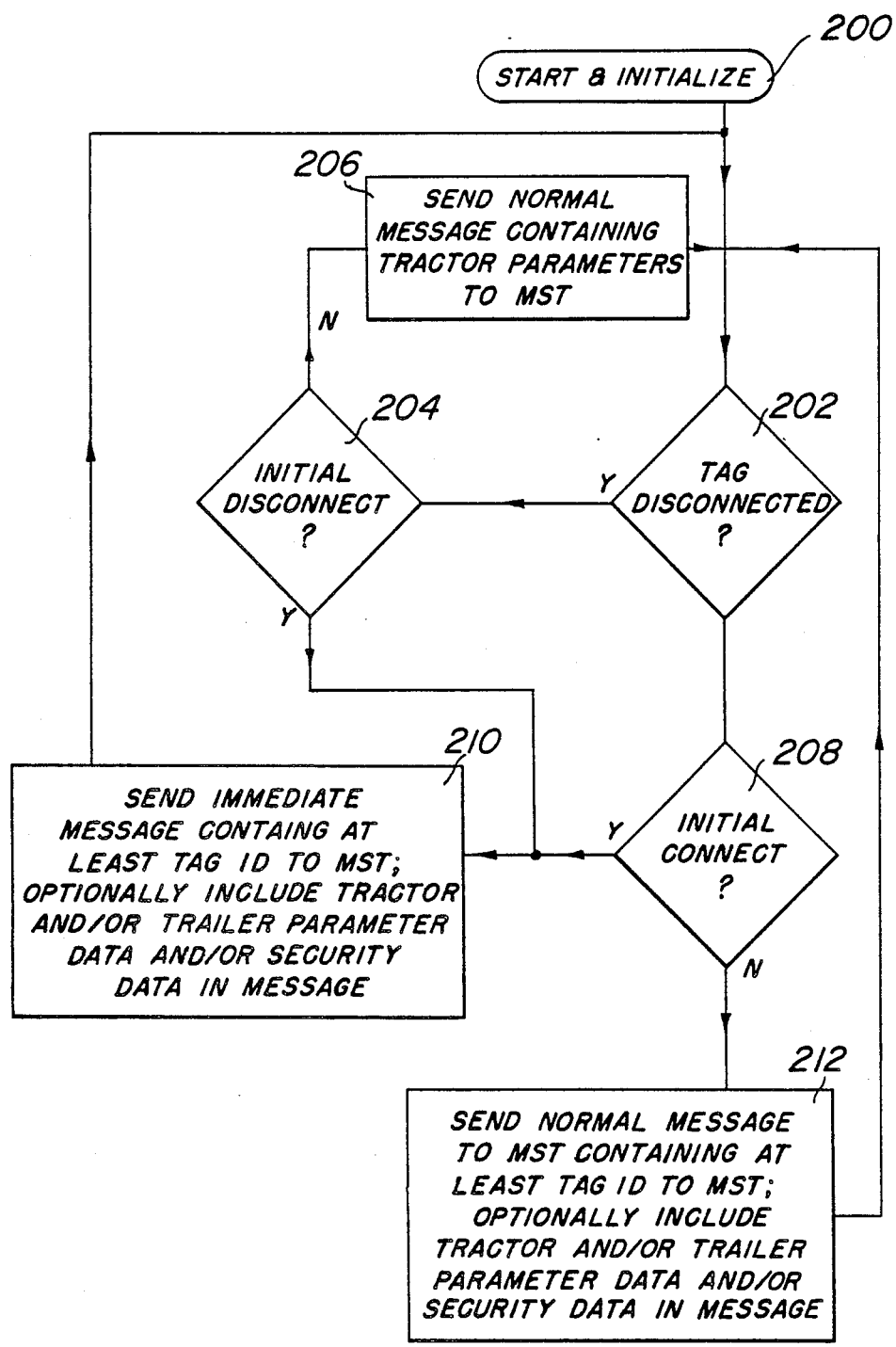
FIG. 6 is a flow chart providing an overview of the IFU function.
Figure 9A:
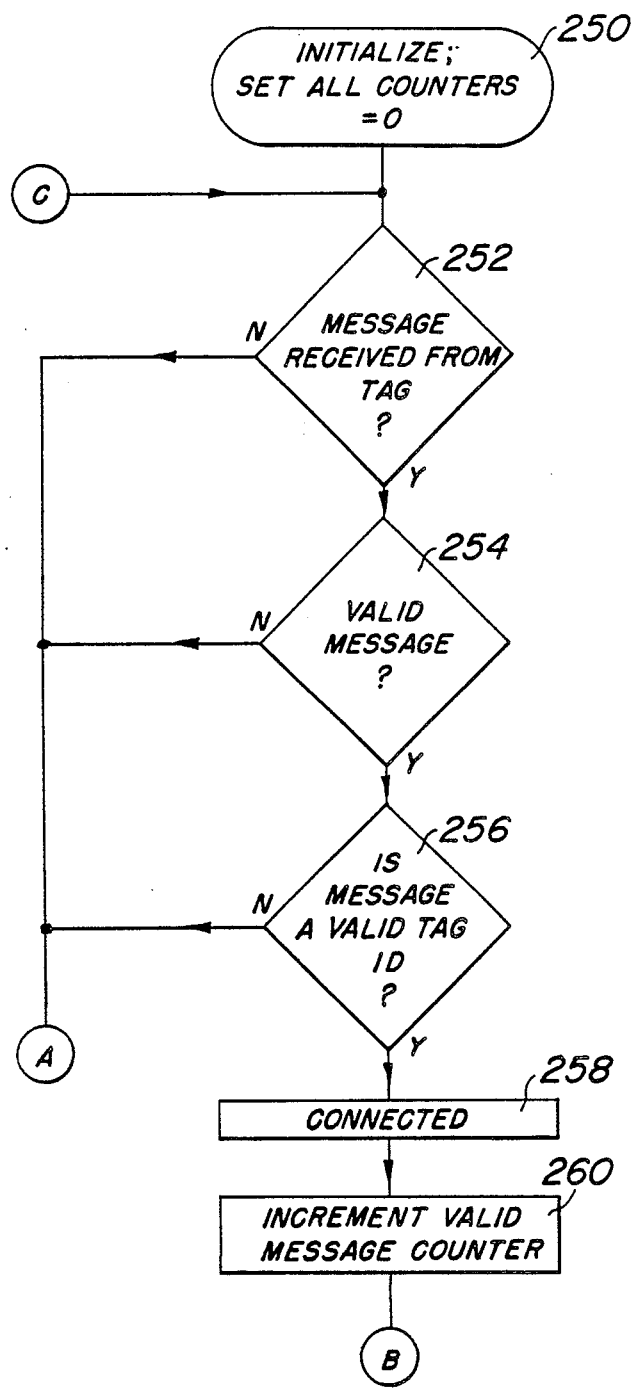
FIGS. 9A-9C are flow charts illustrating in greater detail the function of an IFU according to a preferred embodiment of the invention.
Figure 9B:
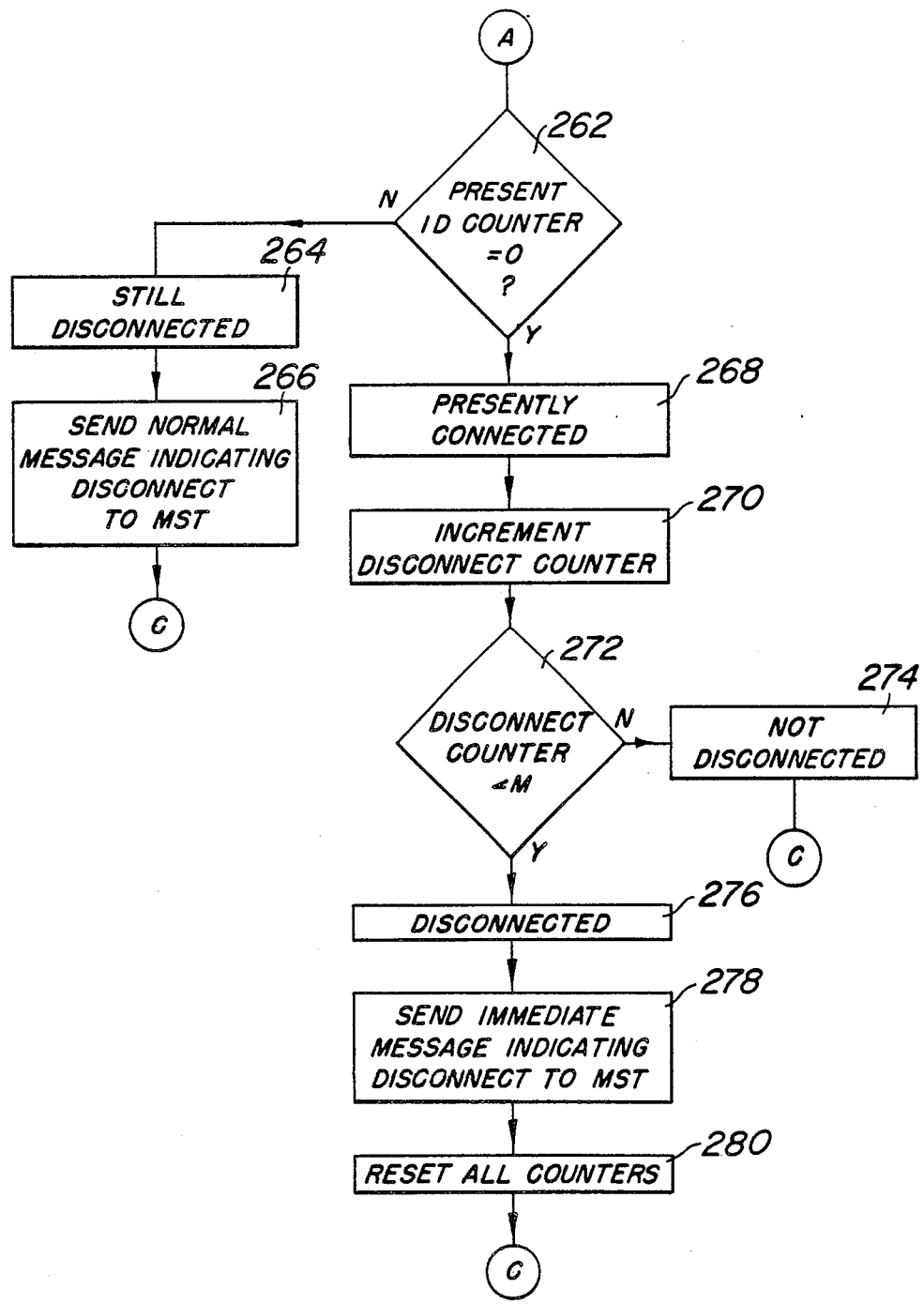
Figure 9C:
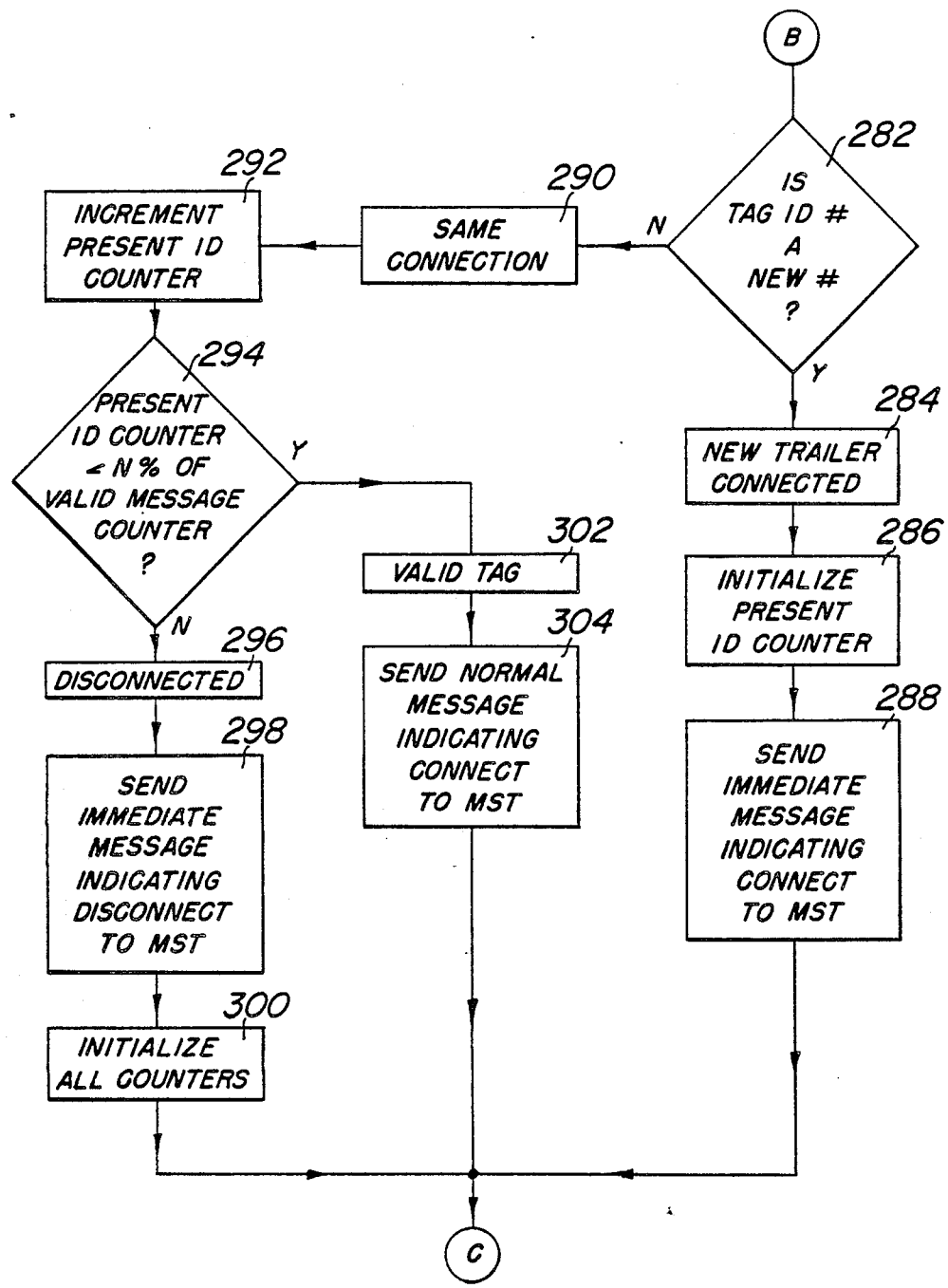

FIG. 6 illustrates the general overview of the IFU function. The detailed IFU functions are illustrated in FIGS. 9A-9C. Those skilled in the art will appreciate that the functions to be described can easily be implemented by well known programming techniques.

As illustrated at block 200, when an IFU is first energized, all hardware and software is reset and initialized. Thereafter, as indicated at block 202, IFU 26 determines whether a previously connected trailer 14 containing a tag 24 or 24, has been disconnected, i.e., whether no valid ID code has been detected. If a trailer disconnect has been detected, IFU 26 next determines whether or not this is an initial disconnect, as illustrated at block 204. Thus, a determination is made as to whether the lack of a valid ID code is new, thus indicating that a trailer 14 has just been disconnected. If it is determined that this is not an initial disconnect, then a further determination is made that the tractor bears no trailer, but that this is not a new event. IFU 26 instructs MST 28 to send a NORMAL message indicating this status (no trailer connected) when the next preselected interval for transmission of a NORMAL message expires, as illustrated at block 206. If provided, the IFU may also provide the tractor operating parameters to the MST for transmission with the next message. As previously mentioned, the MST also provides vehicle position data, if a local position locating unit is provided, time and its own identifier with each transmission.

If, at block 204, it was determined that there has been an initial disconnect, i.e., that the lack of a valid ID code is a new event, then the functions illustrated at block 210 are performed. The IFU 26 instructs the MST 28 to send an IMMEDIATE message containing at least the last detected ID code, and an indication that this trailer has just been disconnected. Optionally, tractor and/or trailer parameter data and/or security data from the vehicle protection device may be included in the message.

If, at block 202, a valid ID code was detected, indicating that a trailer 14 bearing a tag 24 is connected to the tractor, then the determination at block 208 is made. At block 208, a determination is made as to whether a trailer 14 was just connected to the tractor 12, i.e., whether a valid ID code has just been detected, indicating an initial connect. If an initial connect is detected IFU 26 instructs the MST 28 to perform the functions indicated at block 210, as described above. If, on the other hand, it is determined that this is not an initial connect, i.e., that a new ID has not been detected and thus the same trailer is connected, then IFU 26 instructs MST 28 to perform the functions set forth at block 212. Thus, the IFU 26 provides at least the ID code for inclusion in a NORMAL message to occur at the expiration of the next preselected interval. As before, the IFU may provide tractor and/or trailer parameter data and/or security data in the message.

Figure 7:
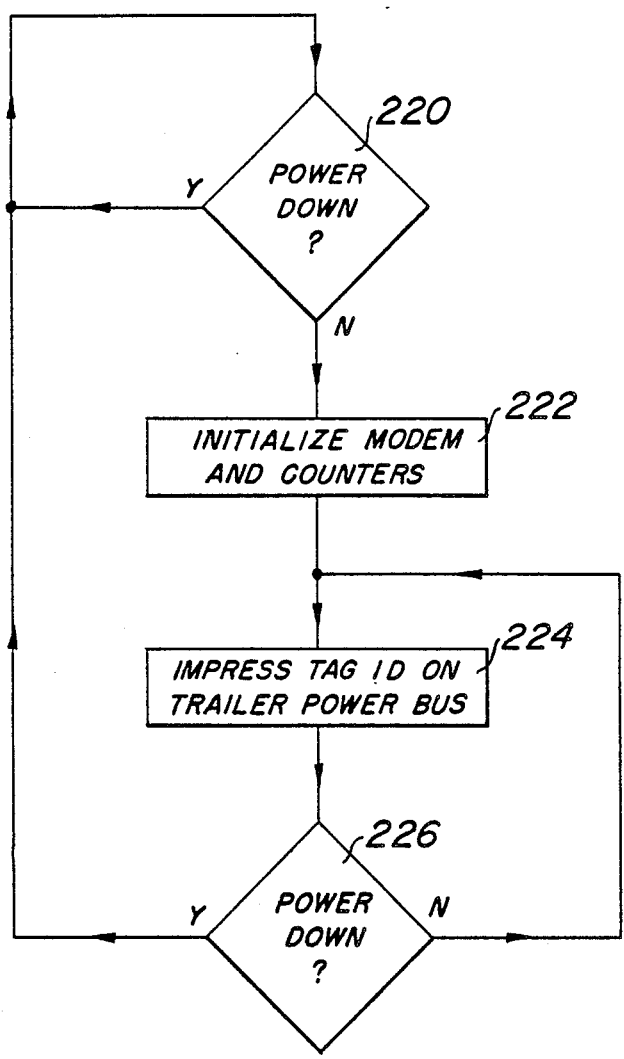
FIG. 7 is a flow chart illustrating the function of a tag according to one preferred embodiment of the invention.

FIG. 7 illustrates, conceptually, the operation of a "dumb" tag, i.e., of the type illustrated in FIG. 3. If the trailer bus 20 has not been energized, then the tag performs no function, as illustrated at block 220. On the other hand, if the trailer's power bus 20 has been energized, then all hardware on board the tag, including the modem and counters, are initialized as illustrated at 222. As illustrated by blocks 224 and 226, the tag 24 repeatedly and cyclically impresses the ID code on the trailer's power bus 20 as long as the power bus 20 is energized.

Figure 8:
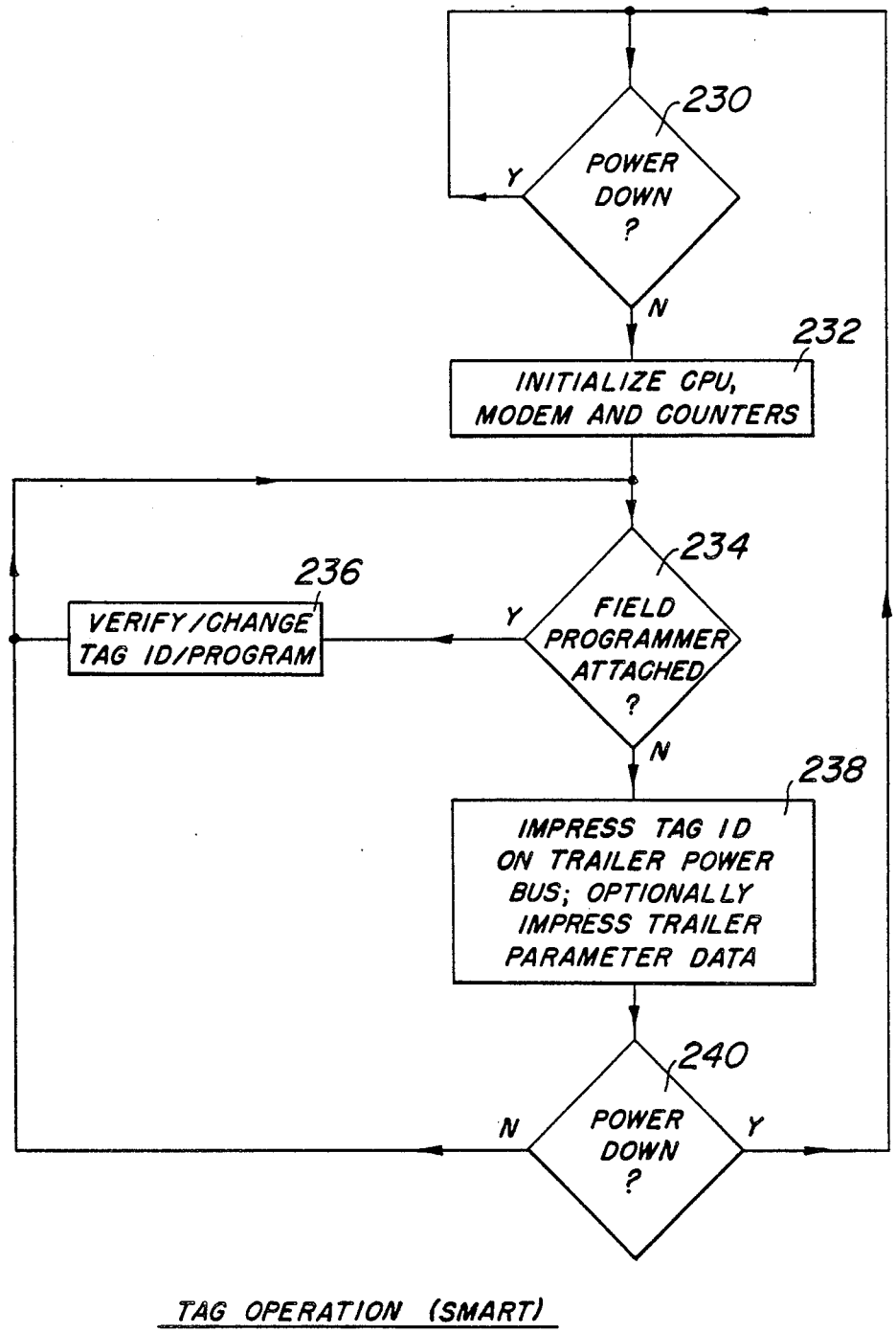
FIG. 8 is a flow chart illustrating the function of a tag according to another preferred embodiment of the invention.

FIG. 8 illustrates the operation of "smart" tag 24, according to the present invention. As illustrated at block 230, the tag 24' performs no function until the power bus 20 has been energized. When the power bus 20 has been energized, the on-board microcomputer 78 and modem 70 (FIG. 4) are initialized, and any software counters that may be used in the program executed by microcomputer 78 are reset. Thereafter, at block 234, microcomputer 78 determines whether a field programmer 90 has been attached to the power bus 20, and if so, whether it is requesting action. If the field programmer 90 is requesting action, the functions illustrated at block 236 are performed. Specifically, the ID code and/or program is verified and/or changed, as commanded by the field programmer 90. If no field programmer is attached, the functions illustrated by block 238 are performed. The ID code may be repeatedly and cyclically impressed on the power bus 20, as in the case of the "dumb" tag of FIG. 3, or the ID code may be impressed upon the power bus 20 upon a request from the IFU 26. Optionally, if provided, trailer parameter data may also be impressed on the power bus 20 for reading and processing by the IFU 26. The functions illustrated by blocks 234, 236 and 238 are repeated in cyclical fashion as long as the power bus 20 is energized, as indicated by block 240.

Referring to FIGS. 9A-9C, the detailed operation of an IFU according to the present invention will now be described. Those skilled in the art will appreciate that the functions described in the various blocks in FIGS. 9A-9C may easily be implemented by well known programming techniques for execution by the microcomputer 92 of IFU 26.

As illustrated at block 250, upon a power up condition, all hardware on board the IFU is initialized and all software counters are reset. As illustrated at block 252, microcomputer 92 monitors the power bus 18 (by polling or other appropriate techniques) to determine whether any data has been received or is available from a tag 24 or 24'. If no data has been received, the functions following "A" on FIG. 9B are performed. If data has been received from a tag 24 or 24', microcomputer 92 then determines whether the data is valid and contains an ID code. If not, the functions following "A" of FIG. 9B are performed. However, if valid data containing an ID code is detected, then microcomputer 92 determines whether the detected ID code is a valid ID code, as indicated at block 256. If it is determined that the detected ID code is not a valid ID code, the functions following "A" of FIG. 9B are performed. If, on the other hand, it is determined that a valid ID code has been detected, then a determination is made that a trailer 14 is connected to the tractor 12, as illustrated at 258. Thereafter, a "valid message counter" is incremented and the functions following "B" on FIG. 9C are performed.

Turning to FIG. 9C, once it has been determined that a trailer is connected and the valid message counter has been incremented, microcomputer 92 determines whether the detected ID code is a new ID code, as indicated at block 282. If it is determined that the detected ID code is a new ID code, then a determination is made that a new trailer 14 has been connected to the tractor 12, as illustrated at block 284, and a "present ID counter" is incremented as illustrated at block 286. Thereafter, the IFU 26 instructs the MST 28 to send an IMMEDIATE message to the satellite containing the newly detected ID code and indicating that a trailer 14 having this ID code has just been connected to the tractor. See block 288. Thereafter, the hereinbefore described functions illustrated by blocks 252 et seq. (FIG. 9A) are repeated.

If, at block 282, it was determined that the detected ID code is not a new ID code, then a determination is made that the connected trailer is not the result of a new connection, i.e., it is determined that a previously connected trailer is still connected, as illustrated at block 290. Thereafter, the "present ID counter" is incremented as illustrated at block 292. At block 294, a test is made to determine whether the value of the "present ID counter" is greater than a preselected percentage (N %) of the value of the "valid message counter". The purpose of this test is to determine whether a previously connected trailer 14 has been only briefly disconnected from its tractor 12. Thus, if a trailer 14 has been only briefly disconnected from its tractor 12, and within a preselected count has been reconnected, then this will be treated as though no disconnection had occurred, as illustrated at blocks 302 and 304. Similarly, the test at block 294 will determine whether no connection at all had occurred, in which case the functions depicted by blocks 302 and 304 are performed. As illustrated at block 302, if no disconnection is detected, a determination is made that a valid tag bearing trailer 14 is still connected. The IFU 26 instructs the MST 28 to send a NORMAL message containing at least the ID code and an indication that the same trailer is still connected to the tractor. The functions performed by blocks 252 et seq. (FIG. 9) are thereafter repeated.

If the result of the test at block 294 indicates that a trailer has been disconnected for a period greater than N % of the value of the "valid message counter", then a determination is made that the trailer 14 has been disconnected from the tractor 12, as illustrated at block 296. The IFU 26 thereafter instructs the MST 28 to send an IMMEDIATE message containing at least the last detected ID code (i.e., the ID of the trailer that was just disconnected) and an indication that this trailer was just disconnected. Thereafter, as indicated at block 300, all counters are initialized (reset) and the functions depicted by blocks 252 et seq. (FIG. 9A) are repeated.

As mentioned, if the result of any one of the determinations made at blocks 252, 254 or 256 is negative, the functions following "A" (FIG. 9B) are performed. These will now be discussed.

As illustrated at block 262, a test is performed to determine whether the value of the "present ID counter" is zero. If the value of the "present ID counter" is not zero, then a determination is made that there is still no trailer connected to the tractor, as illustrated at block 254. The IFU provides this status (disconnected) to the MST 28 for inclusion in its next NORMAL message to the satellite. Thereafter, the functions depicted by blocks 252 et seq. (FIG. 9A) are repeated.

If the result of the test at block 262 indicates that the value of the "present ID counter" is equal to zero, then a determination is made that a trailer is presently connected to the tractor, as indicated by block 268, and the "disconnect counter" is incremented, as illustrated by block 270. At block 272, a test is made to determine whether the value of the "disconnect counter" is less than a preselected value M. If the value of the "disconnect counter" is not less than the value M, then a determination is made that the trailer is still connected, as indicated by block 274, and the functions depicted by blocks 252 et seq. (FIG. 9A) are repeated. However, if the result of the test indicates that the value of the "disconnect counter" is less than the preselected value M, then a determination is made that a trailer has just been disconnected, as indicated at block 276. The IFU 26 thereafter instructs the MST 28 to send an IMMEDIATE message containing at least the last detected ID code (the ID code of the trailer that was just disconnected) and an indication that this trailer was just disconnected. See block 278. Subsequently, all counters are reset (block 280) and the functions depicted by blocks 252 et seq. (FIG. 9A) are repeated.

Though not depicted in the drawings, it should be understood that the microcomputer 92 could be programmed to be responsive to any one or more of a number of chosen conditions to command the MST to send an EMERGENCY message. For example, the occurrence of an alarm signal from a vehicle protection device 42 or an abnormality in any of the tractor and/or trailer parameter data could be cause for sending an EMERGENCY message. Moreover, though not depicted in the flow charts of FIGS. 9A-9C, the broadcast of each NORMAL, IMMEDIATE and/or EMERGENCY message may optionally be accompanied by the tractor and/or trailer parameter data.

In summary, it will be appreciated from the flow charts of FIGS. 6, 7, 8 and 9A-9C that the tag 24 or 24', IFU 26 and MST 28 cooperate to monitor the status of the vehicle by performing the following steps:
 (a) impressing a unique ID code on an existing electrical system of the vehicle when a second part of the vehicle (trailer) is connected to a first part of the vehicle (tractor);
 (b) detecting whether a valid ID code has been impressed on the vehicle's existing electrical system;
 (c) providing a status indication representing the connect/disconnect status of the second part of the vehicle (trailer) based upon the result of step (b);
 (d) transmitting the status indication, and also the ID code if a valid ID code has been detected, to a central station at regular preselected intervals; and
 (e) transmitting the status indication and the ID code to the central station substantially immediately upon any change in the status indication.

There has been shown and described a novel apparatus and method for monitoring the status of a multiple part vehicle and for managing a fleet of vehicles by keeping track of their status, location, etc. Many changes, modifications, variations and other uses and applications of the subject invention will, however, become apparent to those skilled in the art after considering this specification and accompanying drawings which disclose preferred embodiments thereof. All such changes, modifications, variations and other uses and applications which do not depart from the spirit and scope of the invention are deemed to be covered by the invention which is limited only by the claims which follow.

We claim:
1. Status monitoring apparatus for a vehicle having at least first and second parts comprising:
 (a) a tag for placement on the second part of the vehicle, the tag providing signals containing a unique ID code when the second part of the vehicle is coupled to the first part of the vehicle; and
 (b) an interface unit (IFU) for placement in the first part of the vehicle for detecting the presence of a valid ID code from the tag and for providing a status indication that the second part is connected when a valid ID code is detected and that the second part is disconnected when a valid ID code is not detected, the IFU having means for providing the status indication, and the ID code when a valid ID code has been detected, to a mobile satellite transmitter (MST) on the vehicle.

2. Appartus according to claim 1 wherein the MST operates under control of the IFU to normally transmit the status indication, and the ID code when available, at regular preselected intervals but is responsive to a command from the IFU to substantially immediately transmit (i) the status indication and ID code when the presence of a valid ID code is initially detected and (ii) the status indication and the last detected ID code when the lack of a valid ID code is initially detected.

3. Apparatus according to claim 1 wherein the vehicle comprises a power bus and the tag impresses the signals on the power bus for receipt by the IFU.

4. Apparatus according to claim 3 wherein the tag modulates the power bus with the ID code.

5. Apparatus according to claim 2 wherein the MST includes a position locating system for providing vehicle position data and each transmission by the MST includes vehicle position data.

6. Apparatus to claim 1 wherein the tag is dumb and cyclically and repeatedly provides the signals containing the ID code.

7. Apparartus according to claim 1 wherein the tag is smart and is responsive to a request from the IFU to provide the signals containing the ID code.

8. Apparatus according to claim 7 wherein the tag is responsive to commands from a field programmer to alter the ID code.

9. Apparatus according to claim 2 wherein a RDSS system provides vehicle position data to an earth station based upon each MST transmission.

10. Apparatus according to claim 7 wherein the tag is responsive to commands from a field programmer to alter an operating program stored in a memory in the tag.

11. Status monitoring system for a vehicle of the type comprising a tractor and a detachable trailer, the tractor having a power bus with a power cable that is connectable to the trailer when the trailer is coupled to the tractor, the trailer having a power bus that is energized and electrically coupled to the tractor's power bus when the power cable is connected thereto, the system comprising:
 (a) a tag on the trailer for electronically impressing an ID code on the trailer's power bus when energized, the ID code uniquely identifying the trailer:
 (b) an interface unit (IFU) on the tractor for detecting the presence of a valid ID code on the tractor's power bus and for providing a status indication that a trailer is connected to the tractor when a valid ID code is detected and that no trailer is connected to the tractor when a valid ID code is not detected;

(c) a mobile satellite transmitter (MST) for receiving the status indication from the IFU and transmitting the same at preselected intervals to an earth station via a space-based satellite.

12. System according to claim 1 wherein the tag repeatedly and cyclically impresses the ID code on the trailer's power bus and the IFU monitors the tractor's power bus to determine whether a valid ID code has been impressed thereon.

13. Systems according to claim 11 wherein the tag has inputs for trailer sensors that provide trailer parameter data, the tag further impressing the trailer parameter data on the trailer's power bus, the IFU reading the trailer parameter data from the tractor's power bus and providing the same to the MST for transmission to the earth station.

14. System according to claim 11 wherein the tag comprises a modem and the ID code is impressed on the trailer's power bus by modulating the same with serial digital data.

15. System according to claim 11 wherein the tag comprises:
(a) nonvolatile memory means for storing the ID code;
(b) counter means for repeatedly and cyclically addressing sequential locations of the memory means and reading out data stored therein;
(c) modem means for modulating the data read out from the memory;
(d) a buffer/transmitter means for impressing the modulated data on the trailer's power bus.

16. System according to claim 11 wherein the tag comprises:
(a) alterable memory means for storing the ID code;
(b) microcomputer means coupled to the memory means for reading data stored therein;
(c) modem means coupled to the microcomputer means for modulating data read from the memory means and for demodulating data to be processed by the microcomputer means;
(d) receiver/transmitter/buffer means for impressing modulated data from the modem means onto the trailer's power bus and for providing modulated data appearing on the trailer's power bus to the modem means.

17. System according to claim 16 wherein the microcomputer means is responsive to a field programmer connectable to the power bus to alter the ID code stored in the memory means.

18. System according to claim 11 wherein the IFU has inputs for tractor sensors that provide tractor parameter data, the IFU reading the tractor parameter data and providing the same to the MST for transmission to the earth station.

19. System according to claim 9 wherein the IFU has an input for receiving an alarm signal from a vehicle protection device, the IFU providing the alarm indication to the MST for transmission to the earth station.

20. System according to claim 14 wherein the IFU comprises:
(a) receiver/buffer means for receiving modulated serial digital data appearing on the tractor's power bus;
(b) modem means operatively coupled to the receiver/buffer means for demodulating received data;
(c) first means for converting demodulated data to parallel data format;
(d) microcomputer means for determining whether the parallel data includes a valid ID code, the microcomputer means providing the status indication and further providing any detected ID code;
(e) second means for converting the status indication and any detected ID code provided by the microcomputer means into serial data format for presentation to a serial communications port of the MST.

21. System according to claim 20 wherein the IFU further comprises a display for visually presenting vehicle status information.

22. System according to claim 20 wherein the first and second means comprise universal asynchronous receiver/transmitters.

23. System according to claim 11 wherein the MST operates under control of the IFU to normally transmit the status indication at the preselected intervals but is responsive to a command from the IFU to substantially immediately transmit (i) the status indication when the presence of a valid ID code is initially detected and (ii) the status indication and the last detected ID code when the lack of a valid ID code is initially detected.

24. System according to claim 11 wherein the IFU has an input for receiving an alarm signal from a vehicle protection device and wherein the MST operates under control of the IFU to normally transmit the status indication at the preselected intervals but is responsive to a command from the IFU to substantially immediately transmit an alarm indication when an alarm signal is received by the IFU.

25. System according to claim 11 wherein, when the IFU detects a valid code, the ID code is provided to the MST together with the status indication for transmission to the earth station.

26. System according to claim 11 wherein the MST includes a clock and each MST transmission is accompanied by data indicating the time of the transmission.

27. System according to claim 11 wherein the MST includes its own identifier in each transmission.

28. Apparatus according to claim 9 wherein the MST includes a position locating unit and the MST receives vehicle position data therefrom for inclusion with each transmission.

29. Apparatus according to claim 11 wherein a RDSS system provides vehicle position data to the earth station based upon each MST transmission.

30. Apparatus according to claim 16 wherein the microcomputer is responsive to a field programmer connectable to the power bus to alter an operating program stored in a memory means.

31. Method of monitoring the status of a multiple part vehicle having at least first and second parts comprising the steps of:
(a) impressing unique ID code on an existing electrical system of the vehicle when a second part of the vehicle is connected to a first part of the vehicle;
(b) detecting whether a valid ID code has been impressed on the vehicle's existing electrical system;
(c) providing a status indication representing the connect/disconnect status of the second part of the vehicle based upon the result of step (b);
(d) transmitting the status indication, and also the ID code if a valid ID code has been detected, to a central station at regular preselected intervals;

(e) transmitting the status indication and the ID code to the central station substantially immediately upon any change in the status indication.

32. Method according to claim 31 further comprising the step of providing vehicle position data with each transmission to the central station.

33. Method according to claim 31 wherein the step of impressing a unique ID code on the vehicle's existing electrical system comprises modulating the electrical system with data indicative of the code.

34. Method according to claim 31 wherein the ID code is cyclically and repeatedly impressed to the vehicle's existing electrical system.

35. Method according to claim 31 wherein an RDSS provides vehicle position data based upon each transmission to the central station.

* * * * *